US012752725B2

(12) United States Patent
Lim

(10) Patent No.: US 12,752,725 B2
(45) Date of Patent: Oct. 6, 2026

(54) DEVICE AND METHOD FOR CONTROLLING AN INTEGRATED MEMORY SYSTEM

(71) Applicants: HYUNDAI MOTOR COMPANY, Seoul (KR); KIA CORPORATION, Seoul (KR)

(72) Inventor: Iksoon Lim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 41 days.

(21) Appl. No.: 18/912,231

(22) Filed: Oct. 10, 2024

(65) Prior Publication Data

US 2025/0153669 A1 May 15, 2025

(30) Foreign Application Priority Data

Nov. 14, 2023 (KR) ........................ 10-2023-0157260

(51) Int. Cl.

| | |
|---|---|
| ***B60R 16/037*** | (2006.01) |
| ***B60N 2/00*** | (2006.01) |
| ***G06V 20/59*** | (2022.01) |
| ***G06V 40/12*** | (2022.01) |
| ***G06V 40/16*** | (2022.01) |
| ***G06V 40/70*** | (2022.01) |

(52) U.S. Cl.

CPC ............ *B60R 16/037* (2013.01); *G06V 20/59* (2022.01); *B60N 2/0024* (2023.08); *G06V 40/12* (2022.01); *G06V 40/172* (2022.01); *G06V 40/70* (2022.01)

(58) Field of Classification Search

None

See application file for complete search history.

(56) References Cited

U.S. PATENT DOCUMENTS

| | | | | |
|---|---|---|---|---|
| 10,214,118 B1 * | 2/2019 | Jain | ........................ | B60N 2/002 |
| 2015/0191178 A1 * | 7/2015 | Roy | ........................ | H04W 4/48 701/36 |
| 2016/0163319 A1 * | 6/2016 | Parundekar | ............. | G10L 17/22 704/275 |

(Continued)

FOREIGN PATENT DOCUMENTS

| | | | | |
|---|---|---|---|---|
| CN | 114148273 A * | 3/2022 | ......... | B60R 16/0231 |
| CN | 114422550 A | 4/2022 | | |

(Continued)

*Primary Examiner* — Amelia Vorce

(74) *Attorney, Agent, or Firm* — Lempia Summerfield Katz LLC

(57) ABSTRACT

A device and a method for controlling an integrated memory system (IMS) are provided. The device for controlling the IMS includes a driver data collection module configured to collect driver data for at least one potential driver. The driver data includes position information of a device used by each of the at least one potential driver when driving a vehicle. The device for controlling the IMS further includes a target position setting module configured to set a target position of the IMS for each of the at least one potential driver by performing clustering on the collected driver data; a driver identification module configured to identify a driver of the vehicle; and a target position reproduction module configured to reproduce the set target position based on the identified driver of the vehicle.

16 Claims, 8 Drawing Sheets

(56) References Cited

U.S. PATENT DOCUMENTS

| | | | | |
|---|---|---|---|---|
| 2020/0180534 | A1* | 6/2020 | Köhler | B60R 16/037 |
| 2020/0249822 | A1* | 8/2020 | Penilla | G06F 3/0488 |
| 2021/0078609 | A1* | 3/2021 | Barth | B60W 40/08 |

FOREIGN PATENT DOCUMENTS

| | | | | |
|---|---|---|---|---|
| JP | 2019514112 | A | 5/2019 | |
| KR | 102079351 | B1 * | 2/2020 | B60R 16/037 |
| WO | WO-2020001345 | A1 * | 1/2020 | B60W 50/0098 |

* cited by examiner

DEVICE AND METHOD FOR CONTROLLING AN INTEGRATED MEMORY SYSTEM

CROSS-REFERENCE TO RELATED APPLICATION

This application claims priority to and the benefit of Korean Patent Application No. 10-2023-0157260 filed in the Korean Intellectual Property Office on Nov. 14, 2023, the entire contents of which are incorporated herein by reference.

BACKGROUND

(a) Technical Field

The present disclosure relates to a device and a method for controlling an integrated memory system.

(b) Description of the Related Art

An integrated memory system (IMS) may have a function of storing, in a memory, a setting for a device mainly used when the driver drives a vehicle, such as the driver seat, passenger seat, side mirror, steering wheel, instrument panel, or head-up display of the vehicle, to allow the driver to quickly adjust the vehicle based on the driver's preference stored in the IMS. The setting may indicate a set value such as an angle, position, brightness, or the like of the device used by the driver when driving the vehicle. In other words, the IMS may store an optimal setting for the device used by the driver when driving the vehicle, and quickly re-implement a seat position, a side mirror angle, a steering wheel position, an instrument panel brightness, head-up display position and brightness, or the like, which is appropriate for the driver, as soon as the driver sits on the driver's seat. Therefore, the IMS may be very useful in a vehicle with frequent driver changes.

The statements in this Background section merely provide background information related to the present disclosure and may not constitute prior art.

SUMMARY

The present disclosure provides a device and a method for controlling an integrated memory system (IMS), which may identify different drivers and automatically control and/or adjust the IMS (e.g., automatically reproduce a target position of the IMS for the identified driver).

According to an embodiment, a device for controlling an integrated memory system (IMS) includes a driver data collection module configured to collect driver data for at least one potential driver. The driver data includes position information of a device used by each of the at least one potential driver when driving a vehicle. The device for controlling the IMS further includes a target position setting module configured to set a target position of the IMS for each of the at least one potential driver by performing clustering on the collected driver data; a driver identification module configured to identify a driver of the vehicle; and a target position reproduction module configured to reproduce the set target position based on the identified driver of the vehicle.

The target position setting module may set an average value of the driver data belonging to a cluster as the target position when the cluster is determined as a result of performing the clustering.

The target position setting module may set the maximum or minimum value of the driver data belonging to a cluster as the target position when the cluster is determined as a result of performing the clustering.

The target position setting module may set, as the target position, an average value for the most recent N data (N is a natural number) among the collected driver data when an amount of the collected driver data is insufficient to perform the clustering.

The target position setting module may set the last collected driver data as the target position when an amount of the collected driver data is insufficient to perform the clustering.

The target position setting module may stop the reproduction when receiving a driver input while reproducing the target position.

The driver identification module may receive information on which driver drives the vehicle at a specific time, and identify a corresponding driver for a current time as the driver of the vehicle based on the information.

The driver identification module may receive information on a driver behavior pattern, and identify a corresponding driver for the driver behavior pattern as the driver of the vehicle based on the information.

The driver identification module may identify the driver of the vehicle by using at least one of a driver condition monitoring device, a facial recognition device, a fingerprint recognition device, or a combination thereof.

The driver identification module may identify the driver of the vehicle by using a pressure sensor mounted on a driver seat.

According to an embodiment, a method for controlling an integrated memory system (IMS) includes collecting driver data for at least one potential driver. The driver data includes position information of a device used by each of the at least one potential driver when driving a vehicle. The method further includes: performing clustering on the collected driver data; setting a target position of the IMS for each of the at least one potential driver from a clustering result; identifying a driver of the vehicle; and reproducing the set target position based on the identified driver of the vehicle.

In setting the target position, an average value of the driver data belonging to a cluster may be set as a target position when the cluster is determined as a result of performing the clustering.

In setting the target position, the maximum or minimum value of the driver data belonging to a cluster may be set as the target position when the cluster is determined as a result of performing the clustering.

In setting the target position, an average value for the most recent N date (N is a natural number) among the collected driver data may be set as the target position when an amount of the collected driver data is insufficient to perform the clustering.

In setting the target position, the last collected driver data may be set as the target position when an amount of the collected driver data is insufficient to perform the clustering.

The method may further include stopping the reproduction when receiving a driver input while reproducing the target position.

Identifying the driver may include receiving information on which driver drives the vehicle at a specific time, and identifying a corresponding driver for a current time as the driver of the vehicle based on the information.

Identifying the driver may include receiving information on a driver behavior pattern, and identifying a corresponding driver for the behavior pattern as the driver of the vehicle based on the information.

In identifying the driver, the driver of the vehicle may be identified by using at least one of a driver condition monitoring device, a facial recognition device, a fingerprint recognition device, or a combination thereof.

In the identifying of the driver, the driver of the vehicle may be identified by using a pressure sensor mounted on a driver seat.

Figure 1:
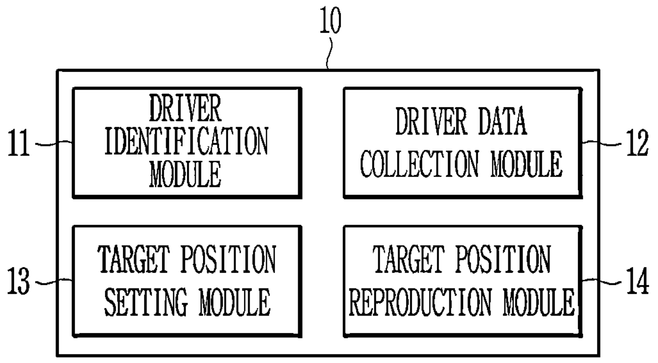
FIG. 1 is a block diagram for explaining a device for controlling an integrated memory system according to an embodiment of the present disclosure.

The drawings described herein are for illustration purposes only and are not intended to limit the scope of the present disclosure in any way.

DETAILED DESCRIPTION

Hereinafter, embodiments of the present disclosure are described in detail with reference to the accompanying drawings so that those having ordinary skill in the art to which the present disclosure pertains may easily practice the present disclosure. However, the present disclosure may be implemented in various different forms and is not limited to the embodiments described herein. In addition, in the drawings, portions unrelated to the description are omitted to clearly describe the present disclosure, and similar portions are denoted by similar reference numerals throughout the specification.

Through the specification and claims, unless explicitly described otherwise, "including" any components should be understood to imply the inclusion of another component rather than the exclusion of another component. Terms including ordinal numbers such as "first", "second", and the like, may be used to describe various components. However, these components are not limited by these terms. This term is used only to distinguish one component from another component.

Terms such as "~part", "~er/or", and "module" described in the specification may refer to a unit capable of processing at least one function or operation described in the specification, which may be implemented as hardware, a circuit, software, or a combination of hardware or circuit and software.

When a component, unit, module, device, element, apparatus, or the like of the present disclosure is described as having a purpose or performing an operation, function, or the like, the component, controller, device, element, apparatus, or the like should be considered herein as being "configured to" meet that purpose or to perform that operation or function. Each component, controller, device, element, apparatus, and the like may separately embody or be included with a processor and a memory, such as a non-transitory computer readable media, as part of the apparatus.

The term "unit" or "module" used in this specification signifies one unit that processes at least one function or operation, and may be realized by hardware, software, or a combination thereof. The operations of the method or the functions described in connection with the forms disclosed herein may be embodied directly in a hardware or a software module executed by a processor, or in a combination thereof.

In the present disclosure, each of phrases such as "A or B", "at least one of A and B", "at least one of A or B", "A, B or C", "at least one of A, B and C", "at least one of A, B or C" and "at least one of A, B, or C, or a combination thereof" may include any one or all possible combinations of the items listed together in the corresponding one of the phrases.

Hereinafter, for clarity and convenience of the explanation, the description mainly describes an integrated memory system (IMS) of a vehicle. However, a technical scope of the present disclosure is not limited thereto. Even in a case of any of various transportation means a driver rides other than the vehicle, when a function of the IMS is implemented on a device used by the driver when driving the corresponding means, the spirit of the present disclosure described in this specification may be applied thereto as it is. Accordingly, although the term "vehicle" is used herein, the scope of the present disclosure is intended to include the various other transportation means the driver rides.

Figure 2:
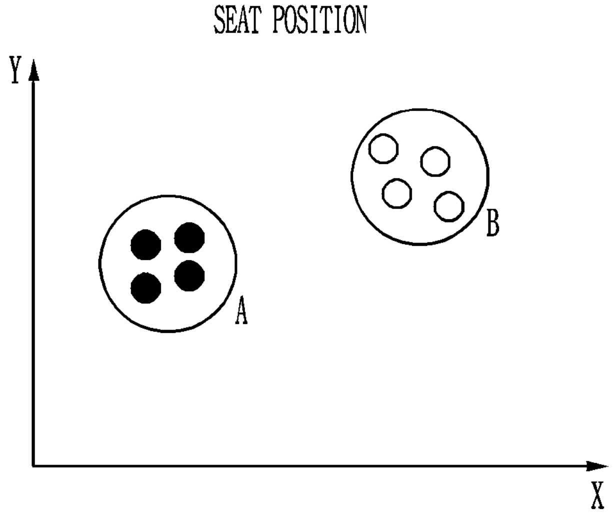
FIG. 2 is a diagram for explaining an operation of the device for controlling an integrated memory system according to an embodiment of the present disclosure.

FIG. 1 is a block diagram for explaining a device for controlling an integrated memory system (IMS) according to an embodiment, and FIG. 2 is a diagram for explaining an operation of the device for controlling an integrated memory system according to an embodiment.

Referring to FIG. 1, a device 10 for controlling an integrated memory system according to an embodiment may include a driver identification module 11, a driver data collection module 12, a target position setting module 13, and a target position reproduction module 14.

The driver identification module 11 may identify a driver of a vehicle. The driver identification module 11 may identify the driver in various ways, including the embodiments disclosed herein. In addition, the driver identification module 11 may generate or manage an identifier capable of distinguishing different drivers. The identifier may also be used by another module which may be implemented inside or outside the device 10 for controlling an integrated memory system. Details of identifying the driver are described below with respect to FIGS. 3, 4, 6, and 7.

The driver data collection module 12 may collect driver data for at least one potential driver. The at least one potential driver may be one or more drivers who drove the vehicle including the device 10 for controlling an integrated memory system in the past. The driver data may include position information of the device used by each of the at least one potential driver when driving the vehicle. The device used by each of the at least one potential driver when driving the vehicle may include, as an example, at least one of an electric seat, an electric steering wheel, a side mirror, or any combination thereof. The electric seat may have a function of being adjusted to its position or angle desired by the driver or a passenger, by using a mechanical part including an electric seat motor, and the driver data may include information on the position and angle of the electric seat as its position information. The electric steering wheel may use an electric motor to adjust its height or depth to suit the driver's convenience, and the driver data may include information on the height and depth of the steering wheel as its position information. The side mirror may have its direction adjustable by the driver using a button or a switch in the vehicle, and the driver data may include information on the direction of the side mirror as the position information.

In some embodiments, the driver data may include additional information in addition to the position information of the device used by the at least one potential driver when driving the vehicle. As an example, when the device used by the at least one potential driver when driving the vehicle includes a cluster, the driver data may further include information on brightness of an instrument panel in addition to the position information. As another example, when the device used by the at least one potential driver when driving the vehicle includes a head-up display, the driver data may further include information on the position and brightness of the head-up display in addition to the position information.

The target position setting module 13 may set a target position of the IMS for each of the at least one potential driver by performing clustering on the driver data collected by the driver data collection module 12.

The target position setting module 13 may perform the clustering on the driver data including the position information of the device used by the at least one potential driver when driving the vehicle to thus generate a cluster. The clustering may indicate that classification is performed by automatically grouping unlabeled samples into clusters. In some embodiments, the target position setting module 13 may perform the clustering on the driver data based on the number of clusters predetermined in consideration of its specific implementation purpose and environment, design goal, clustering performance goal, or the like. In some other embodiments, the target position setting module 13 may determine an optimal number of clusters for the driver data by using a method such as an elbow method, a silhouette score, density-based spatial clustering of applications with noise (DBSCAN), hierarchical clustering, cross-validation, or the like.

As an example, the target position setting module 13 may perform the clustering on the driver data on the position of the electric seat. As a result, the position of the electric seat in the collected driver data may include a first position and a second position that is separated from the first position by a difference not outside a preset range. In this case, the first position and the second position may belong to one cluster. The position of the electric seat in the collected driver data may include a third position that is separated from the first position by a difference outside the preset range. In this case, the first position and the third position may belong to different clusters. Similarly, the angle of the electric seat in the collected driver data may include a first angle and a second angle that is separated from the first angle by a difference not outside a preset range. In this case, the first angle and the second angle may belong to one cluster. The angle of the electric seat in the collected driver data may include a third angle that is separated from the first angle by a difference outside the preset range. In this case, the first angle and the third angle may belong to different clusters.

As another example, the target position setting module 13 may perform the clustering on the driver data on the position of the electric steering wheel. As a result, the height of the electric steering wheel in the collected driver data may include a first height and a second height that is separated from the first height by a difference not outside a preset range. In this case, the first height and the second height may belong to one cluster. The height of the electric steering wheel in the collected driver data may include a third height that is separated from the first height by a difference outside the preset range. In this case, the first height and the third height may belong to different clusters. Similarly, the depth of the electric seat in the collected driver data may include a first depth and a second depth that is separated from the first depth by a difference not outside a preset range. In this case, the first depth and the second depth may belong to one cluster. The depth of the electric steering wheel in the collected driver data may include a third depth that is separated from the first depth by a difference outside the preset range. In this case, the first depth and the third depth may belong to different clusters.

As another example, the target position setting module 13 may perform the clustering on the driver data on the position of the side mirror. As a result, the direction of the side mirror in the collected driver data may include a first direction and a second direction that is separated from the first direction by a difference not outside a preset range. In this case, the first direction and the second direction may belong to one cluster. The direction of the side mirror in the collected driver data may include a third direction that is separated from the first direction by a difference outside the preset range. In this case, the first direction and the third direction may belong to different clusters.

The target position setting module 13 may perform the clustering in the same way on the brightness of the instrument panel or the position and brightness of the head-up display.

Referring to FIG. 2 together, an example result of the clustering performed on the position of the electric seat is shown. A horizontal axis may represent the position of the electric seat in an X direction, and a vertical axis may represent the position of the electric seat in a Y direction. As a result of the clustering, it may be seen that the position of the electric seat that is suitable for any driver may be classified into cluster A, and the position of the electric seat that is suitable for another driver may be classified into cluster B. The target position setting module 13 may set each target position between the clusters A and B based on a preset reference, as described below.

The target position setting module 13 may set the target position of the IMS for each of the at least one potential driver based on a clustering result. When determining a cluster as the result of performing the clustering, the target position setting module 13 may set the target position by adopting the cluster in consideration of its specific implementation purpose and environment, design goal, clustering performance goal, or the like.

In some embodiments, the target position setting module 13 may set an average value of the driver data belonging to the cluster as the target position when (e.g., after) the cluster is determined as a result of performing the clustering (i.e., by performing the clustering). In other words, the target position setting module 13 may set an average value of the driver data belonging to the cluster as the target position in response to determination of cluster after performing the clustering. As an example, a cluster related to the position of the electric seat may include a plurality of position values.

In this case, the target position setting module 13 may set an average value of the plurality of position values as a target position (i.e., target position value) of the corresponding cluster. As an example, a cluster related to the angle of the electric seat may include a plurality of angle values. In this case, the target position setting module 13 may set an average value of the plurality of angle values as a target position (i.e., target angle value) of the corresponding cluster. As another example, a cluster related to the height of the electric steering wheel may include a plurality of height values. In this case, the target position setting module 13 may set an average value of the plurality of height values as a target position (i.e., target height value) of the corresponding cluster. In addition, a cluster related to the depth of the electric steering wheel may include a plurality of depth values. In this case, the target position setting module 13 may set an average value of the plurality of depth values as a target position (i.e., target depth value) of the corresponding cluster. As another example, a cluster related to the direction of the side mirror may include a plurality of direction values. In this case, the target position setting module 13 may set an average value of the plurality of direction values as a target position (i.e., target direction value) of the corresponding cluster.

In some embodiments, the target position setting module 13 may set the maximum or minimum value of the driver data belonging to the cluster as the target position when (e.g., after) the cluster is determined as a result of performing the clustering (i.e., by performing the clustering). In other words, the target position setting module 13 may set the maximum or minimum value of the driver data belonging to the cluster as the target position in response to determination of the cluster after performing cluster. As an example, the target position setting module 13 may set the maximum or minimum of the plurality of position values belonging to the cluster related to the position of the electric seat as the target position (i.e., target position value) of the corresponding cluster. In addition, the target position setting module 13 may set the maximum or minimum of the plurality of angle values belonging to the cluster related to the angle of the electric seat as the target position (i.e., target angle value) of the corresponding cluster. As another example, the target position setting module 13 may set the maximum or minimum of the plurality of height values belonging to the cluster related to the height of the electric steering wheel as the target position (i.e., target height value) of the corresponding cluster. In addition, the target position setting module 13 may set the maximum or minimum of the plurality of depth values belonging to the cluster related to the depth of the electric steering wheel as the target position (i.e., target depth value) of the corresponding cluster. As another example, the target position setting module 13 may set the maximum or minimum of the plurality of direction values belonging to the cluster related to the direction of the side mirror as the target position (i.e., target direction value) of the corresponding cluster.

In some embodiments, the target position setting module 13 may set, as the target position, an average value of the most recent N data (N is a natural number representing the number of data) among the collected driver data when an amount of the collected driver data is insufficient to perform the clustering. As an example, the target position setting module 13 may set an average value of the most recent $N_1$ data among the driver data collected in relation to the position of the electric seat as the target position value of the electric seat, and may set an average value of the most recent $N_2$ data among the driver data collected in relation to the angle of the electric seat as the target angle value of the electric seat. As another example, the target position setting module 13 may set an average value of the most recent $N_3$ data among the driver data collected in relation to the height of the electric steering wheel as the target height value of the electric steering wheel, and may set an average value of the most recent $N_4$ data among the driver data collected in relation to the depth of the electric steering wheel as the target depth value of the electric steering wheel. As another example, the target position setting module 13 may set an average value of the most recent $N_5$ data among the driver data collected in relation to the direction of the side mirror as the target direction value of the side mirror. Each of $N_1$ to $N_5$ is a natural number. $N_1$ data to $N_5$ data may all be set to the same value, or at least some of these data may be set to different values.

In some embodiments, the target position setting module 13 may set the last collected driver data as the target position when the amount of the collected driver data is insufficient to perform the clustering. In other words, the target position setting module 13 may set the last collected driver data as the target position in response to an amount of the collected driver data being insufficient to perform the clustering. As an example, the target position setting module 13 may set the last collected position value among the driver data collected in relation to the position of the electric seat as the target position value and may set the last collected angle value among the driver data collected in relation to the angle of the electric seat as the target angle value. As another example, the target position setting module 13 may set the last collected height value among the driver data collected in relation to the height of the electric steering wheel as the target height value and may set the last collected depth value among the driver data collected in relation to the depth of the electric steering wheel as the target depth value. As another example, the target position setting module 13 may set the last collected direction value among the driver data collected in relation to the direction of the side mirror as the target direction value.

The target position setting module 13 may set the target position in the same way on the brightness of the instrument panel or the position and brightness of the head-up display.

The clustering method or the target position setting method exemplified in this way may be adopted differently for each device used by the at least one potential driver when driving the vehicle, in consideration of the feature, operation condition, operation environment, or the like of the device. In other words, the target position setting module 13 may perform the clustering on a first device among the devices each used by the at least one potential driver when driving the vehicle, by using the predetermined number of clusters, and perform the clustering on a second device, which is different from the first device, by determining the optimal number of clusters together. In addition, the target position setting module 13 may set the average value as a target position of a third device among the devices each used by the at least one potential driver when driving the vehicle, set the maximum value as a target position of a fourth device, which is different from the third device, and set the minimum value as a target position of a fifth device, which is different from the third device or the fourth device. In addition, when the amount of the collected driver data is insufficient to perform the clustering, the target position setting module 13 may set an average value of the most recent N data as a target position of a sixth device among the devices each used by the at leats one potential driver when driving the vehicle, and may set the last collected driver data as a target position of a seventh device, which is different from the sixth device.

The target position reproduction module 14 may reproduce the target position set by the target position setting module 13 based on the driver riding the vehicle identified by the driver identification module 11. As an example, the clustering may be performed by the target position setting module 13, and result data where the target position is set may be mapped with the identifier generated by the driver identification module 11 and then stored in a database, a storage, or the like. When the driver rides the vehicle, the target position reproduction module 14 may search the database, the storage, or the like by using the identifier of the driver riding the vehicle identified by the driver identification module 11, and retrieve data for setting the target position. Based on the retrieved data, the target position reproduction module 14 may reproduce the target position.

As an example, a target position for a first driver may be set to the first set position and first set angle of the electric seat, and may be set to the first height and first depth of the electric steering wheel. In addition, a target position for a second driver who is different from the first driver, may be set to the second set position and second set angle of the electric seat, and may be set to the second height and second depth of the electric steering wheel. When the driver rides the vehicle, the driver identification module 11 may identify the driver riding the vehicle. When identifying the driver riding the vehicle as the first driver, the target position reproduction module 14 may search the database, the storage, or the like by using the identifier for the first driver to thus acquire the target position, and reproduce the acquired target position. Accordingly, the electric seat may be adjusted to have the first set position and the first set angle, and the electric steering wheel may be adjusted to have the first height and the first depth. When identifying the driver riding the vehicle as the second driver, the target position reproduction module 14 may search the database, the storage, or the like by using the identifier for the second driver to thus acquire the target position, and reproduce the acquired target position. Accordingly, the electric seat may be adjusted to have the second set position and the second set angle, and the electric steering wheel may be adjusted to have the second height and the second depth.

In some embodiments, the target position reproduction module 14 may stop the reproduction when receiving a driver input while reproducing the target position. In other words, the target position reproduction module 14 may stop the reproduction in response to a driver input received while reproducing the target position. As an example, while reproducing the target position, the driver may want to directly manipulate his/her position, or want to stop setting the target position because the target position is outside a range desired by the driver. In this case, the driver may generate a user input by using, for example, the IMS or audio, video, and navigation (AVN). Accordingly, the target position reproduction module 14 may stop the reproduction.

According to an embodiment, in cases where there are multiple drivers for a vehicle (e.g., when each of the plurality of drivers drives the vehicle at different time), different drivers can be identified, and an IMS settings suitable for the driver riding the vehicle can be automatically reproduced. In addition, even though the driver does not explicitly input the IMS setting, the device 10 for controlling an integrated memory system may collect the driver data, find the IMS setting suitable for the driver by the clustering, and automatically reproduce the same, thereby greatly improving user convenience.

Figure 3:
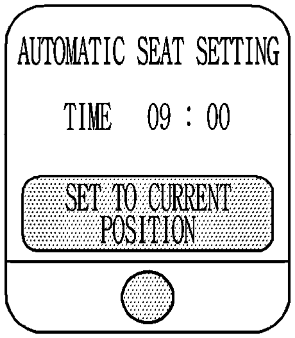
FIGS. 3 and 4 are diagrams for explaining operations of the device for controlling an integrated memory system according to an embodiment of the present disclosure.
Figure 4:
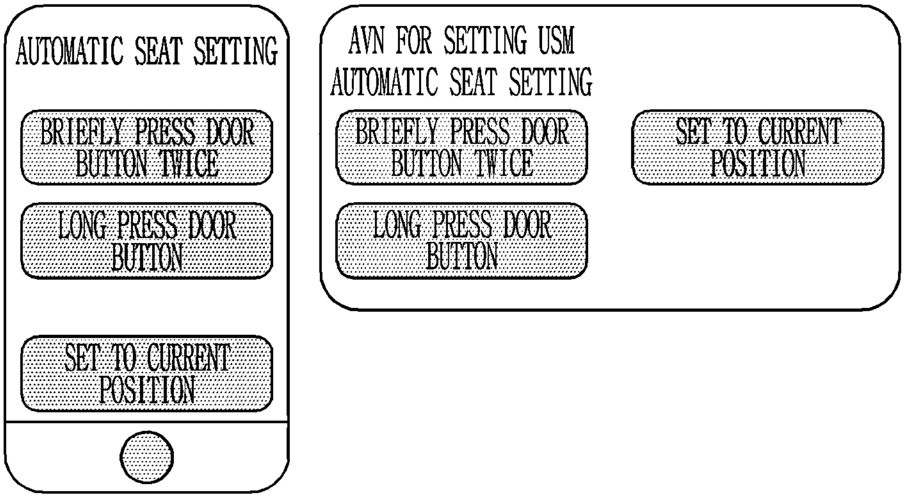

FIGS. 3 and 4 are diagrams for explaining operations of the device for controlling an integrated memory system according to an embodiment.

FIG. 3 shows a user interface that allows a user (or the driver) to set his/her driving time (e.g., a period of time for driving), and shows, for example, a mobile device such as a smartphone or a tablet computer. The device for controlling an integrated memory system according to an embodiment may receive the user input from the mobile device.

In detail, in the device for controlling an integrated memory system according to an embodiment, the driver identification module 11 may receive information on which driver drives the vehicle at a specific time (e.g., a specific period of time) through the mobile device. In addition, the driver identification module 11 may identify a driver corresponding to a current time as a driver matching the information based on the received information. As an example, a first user may set the time (e.g., a period of time) by using the mobile device to drive the vehicle from 8:00 AM to 10:00 AM on weekdays. In this case, when the current time is 8:00 AM on weekdays, the driver identification module 11 may identify the driver of the vehicle as the first user. In addition, the target position reproduction module 14 may reproduce the target position where the first user is set as the driver.

In some embodiments, the target position reproduction module 14 may perform the target position reproduction in advance based on a user setting when the current time reaches the specific time (e.g., the specific period of time) or before the current time reaches the specific time (e.g., the specific period of time). As an example, the user may input a desired setting for the target position reproduction 10 minutes in advance. In this case, the target position reproduction module 14 may perform the reproduction when the current time is 7:50 AM on weekdays.

FIG. 4 shows the user interface through which the user (or the driver) may set a user behavior pattern for the device 10 to identify the user, and shows, for example, the mobile device such as the smart phone or the tablet computer, and the AVN for implementing a user setting mode (USM). The device for controlling an integrated memory system according to an embodiment may receive the user input through the mobile device or the AVN.

In detail, in the device for controlling an integrated memory system according to an embodiment, the driver identification module 11 may receive information on the driver behavior pattern through the mobile device or the AVN. In addition, the driver identification module 11 may identify a driver corresponding to the behavior pattern performed in the vehicle as the driver matching the information based on the received information. As an example, the first user may set a behavior pattern of briefly pressing a door button twice through the mobile device or the AVN. The driver identification module 11 may then identify the driver of the vehicle as the first user when receiving an input of briefly pressing the door button of the vehicle twice. In addition, the target position reproduction module 14 may reproduce the target position where the first user is set as the driver. As another example, the second user may set a behavior pattern of long pressing the door button for a predetermined time through the mobile device or the AVN. The driver identification module 11 may then identify the driver of the vehicle as the second user when receiving an input of long pressing the door button of the vehicle. In addition, the target position reproduction module 14 may reproduce the target position where the second user is set as the driver.

Figure 5:
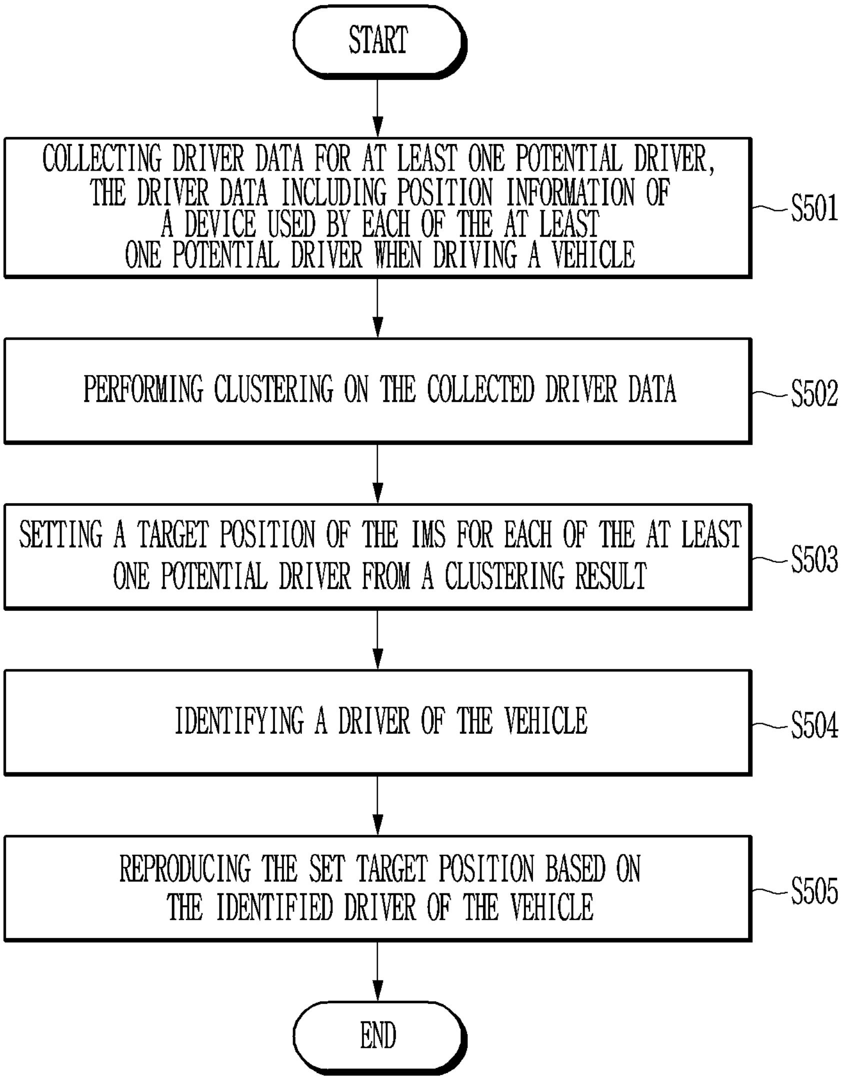
FIG. 5 is a flowchart for explaining a method for controlling an integrated memory system according to an embodiment of the present disclosure.

FIG. 5 is a flowchart for explaining a method for controlling an integrated memory system according to an embodiment.

Referring to FIG. 5, the method for controlling an integrated memory system (IMS) according to an embodiment may include: identifying a driver (S501); collecting driver data including position information of a device used by a driver when driving a vehicle for each driver (S502); performing clustering on the collected driver data (S503); setting a target position of the IMS for each driver from a clustering result (S504); and reproducing the set target position based on the identified driver (S505).

A detailed description of the method may refer to or use the description in this specification that is provided with reference to FIGS. 1 to 4 and 6 to 8, and its redundant description is thus omitted here.

Figure 6:
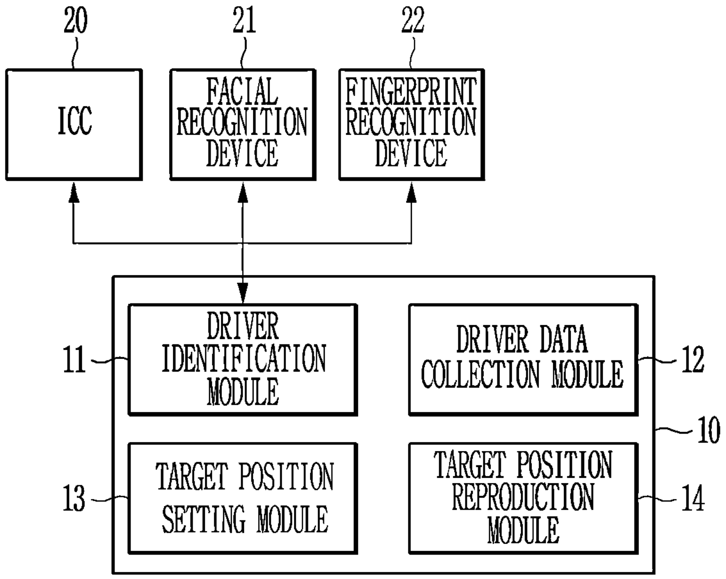
FIG. 6 is a block diagram for explaining the device for controlling an integrated memory system according to an embodiment of the present disclosure.

FIG. 6 is a block diagram for explaining the device for controlling an integrated memory system according to an embodiment.

Referring to FIG. 6, the device 10 for controlling an integrated memory system according to an embodiment may include the driver identification module 11, the driver data collection module 12, the target position setting module 13, and the target position reproduction module 14. A description of the driver identification module 11, the driver data collection module 12, the target position setting module 13, or the target position reproduction module 14 may refer to or use the description in this specification that is provided above with reference to FIGS. 1 to 5, unless the description above contradicts a content described in an embodiment.

The driver identification module 11 may identify the driver by using at least one of a driver condition monitoring device (i.e., in-cabin camera (ICC)) 20, a facial recognition device 21, a fingerprint recognition device 22, or any combination thereof.

The ICC 20 may monitor a driver seat of the vehicle to thus detect and analyze the driver condition and behavior. The ICC 20 may detect the driver condition through the facial recognition, eye tracking, or the like of the driver to determine the driver's lower attention, drowsy driving, drunk driving, or the like. The driver identification module 11 may identify the different drivers by analyzing data on the driver condition collected by the ICC 20.

The driver identification module 11 may also identify the different drivers by using the facial recognition device 21 which may identify an individual by capturing the driver's facial feature and comparing this feature with facial information stored in the database. Alternatively, the driver identification module 11 may also identify the different drivers by using the fingerprint recognition device 22 which may identify an individual by scanning the driver's fingerprint pattern and comparing this pattern with fingerprint information stored in the database.

The target position reproduction module 14 may reproduce the target position set by the target position setting module 13, based on the driver identified in this way.

Figure 7:
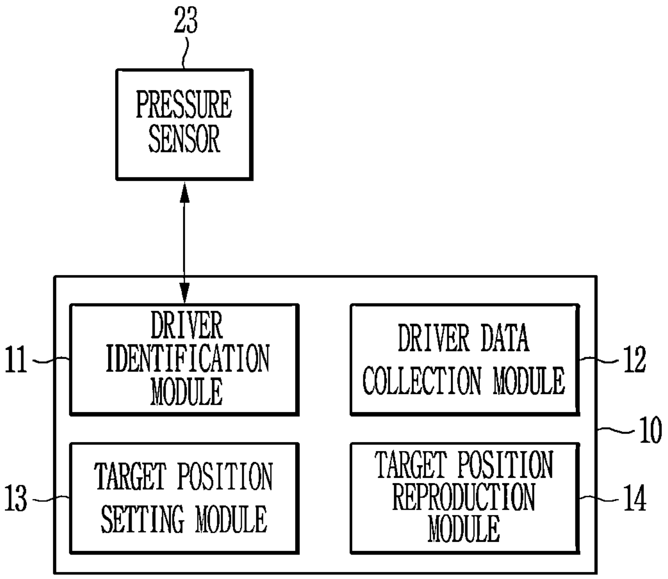
FIG. 7 is a block diagram for explaining the device for controlling an integrated memory system according to an embodiment of the present disclosure.

FIG. 7 is a block diagram for explaining the device for controlling an integrated memory system according to an embodiment.

Referring to FIG. 7, the device 10 for controlling an integrated memory system according to an embodiment may include the driver identification module 11, the driver data collection module 12, the target position setting module 13, and the target position reproduction module 14. A description of the driver identification module 11, the driver data collection module 12, the target position setting module 13, or the target position reproduction module 14 may refer to or use the description in this specification that is provided above with reference to FIGS. 1 to 5, unless the description above contradicts a content described in an embodiment.

The driver identification module 11 may identify the driver by using a pressure sensor 23 mounted on the driver seat. The pressure sensor 23 may be mounted on a seat of the vehicle, and may be used to detect the occupancy condition, weight, and posture of the driver or the passenger. The driver identification module 11 may also identify the driver by using data on the weight or the posture, detected through the pressure sensor 23 mounted on the driver seat. The target position reproduction module 14 may reproduce the target position set by the target position setting module 13, based on the driver identified in this way.

Figure 8:
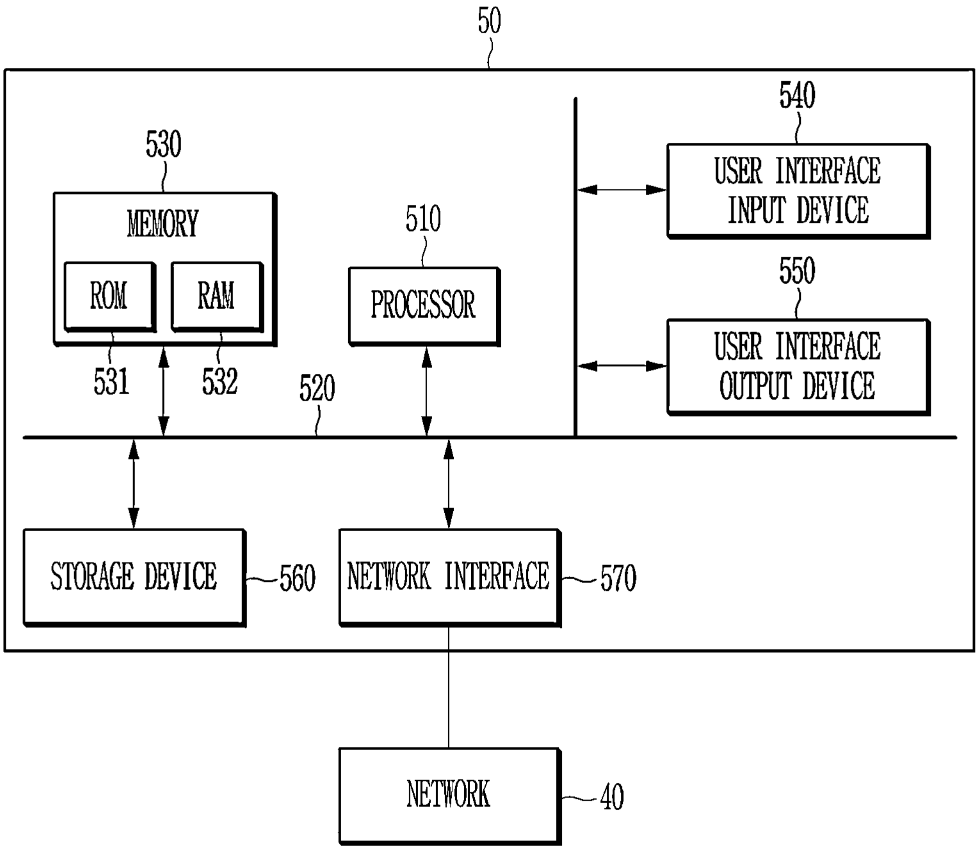
FIG. 8 is a diagram for explaining a computing device according to an embodiment of the present disclosure.

FIG. 8 is a view for explaining a computing device according to an embodiment.

Referring to FIG. 8, the device and the method for controlling an integrated memory system according to embodiments may be implemented using a computing device 50.

The computing device 50 may include at least one of a processor 510, a memory 530, a user interface input device 540, a user interface output device 550, a storage device 560, or any combination thereof, performing their communications by using a bus 520. The computing device 50 may also include a network interface 570 electrically connected to a network 40. The network interface 570 may transmit or receive a signal with another entity through the network 40.

The processor 510 may be implemented in any of various types such as a micro controller unit (MCU), an application processor (AP), a central processing unit (CPU), a graphic processing unit (GPU), a neural processing unit (NPU), and a quantum processing unit (QPU), and may be any semiconductor device executing an instruction stored in the memory 530 or the storage device 560. The processor 510 may implement the functions and methods described above with respect to FIGS. 1 to 7.

The memory 530 and the storage device 560 may include various types of volatile or non-volatile storage media. As an example, the memory may include a read-only memory (ROM) 531 and a random access memory (RAM) 532. The memory 530 may be disposed inside or outside the processor 510, and may be connected to the processor 510 through various means that are well-known.

In some embodiments, at least some components or functions of the device and the method for controlling an integrated memory system according to the embodiments may be implemented as a program or software executed by the computing device 50, and the program or software may be stored in a computer-readable medium. In detail, the computer-readable medium according to an embodiment may include a program for executing the device for controlling an integrated memory system and the steps included in the method for controlling the same according to the embodiments that is recoded on a computer including the processor 510 executing the program or instruction stored in the memory 530 or the storage device 560.

In some embodiments, at least some components or functions of the device and the method for controlling an integrated memory system according to the embodiments may be implemented using the hardware or circuitry of the computing device 50, or implemented using a separate hardware or circuitry that may be electrically connected to the computing device 50.

The device and the method for controlling the integrated memory system (IMS) according to the embodiments described above may identify the different drivers and automatically reproduce the IMS.

Although the embodiments of the present disclosure have been described in detail hereinabove, the scope of the present disclosure is not limited thereto. In other words, various modifications and alterations made by those having ordinary skill in the art to which the present disclosure pertains by using a basic concept of the present disclosure as defined in the following claims also fall within the scope of the present disclosure.

What is claimed is:

1. A device for controlling an integrated memory system (IMS), the device comprising:
a processor; and
a memory storing instructions configured to cause, when executed by the processor, the processor to:
collect driver data for at least one potential driver, the driver data including position information of a device used by each of the at least one potential driver when driving a vehicle;
set a target position of the IMS for each of the at least one potential driver by performing clustering on the collected driver data;
identify a driver of the vehicle; and
reproduce the set target position based on the identified driver of the vehicle,
wherein the instructions are further configured to cause the processor to set a maximum or minimum value of the driver data belonging to a cluster as the target position when the cluster is determined as a result of performing the clustering.

2. The device of claim 1, wherein
the instructions are further configured to cause the processor to set, as the target position, an average value of the most recent N data among the collected driver data when an amount of the collected driver data is insufficient to perform the clustering, wherein N is a natural number.

3. The device of claim 1, wherein
the instructions are further configured to cause the processor to set the last collected driver data as the target position when an amount of the collected driver data is insufficient to perform the clustering.

4. The device of claim 1, wherein
the instructions are further configured to cause the processor to stop the reproduction when receiving a driver input while reproducing the target position.

5. The device of claim 1, wherein
the instructions are further configured to cause the processor to
receive information on which driver drives the vehicle at a specific time, and
identify a corresponding driver for a current time as the driver of the vehicle based on the information.

6. The device of claim 1, wherein
the instructions are further configured to cause the processor to
receive information on a driver behavior pattern, and
identify a corresponding driver for the driver behavior pattern as the driver of the vehicle based on the information.

7. The device of claim 1, wherein
the instructions are further configured to cause the processor to identify the driver of the vehicle by using at least one of a driver condition monitoring device, a facial recognition device, a fingerprint recognition device, or a combination thereof.

8. The device of claim 1, wherein
the instructions are further configured to cause the processor to identify the driver of the vehicle by using a pressure sensor mounted on a driver seat.

9. A method for controlling an integrated memory system (IMS), the method comprising:
collecting driver data for at least one potential driver, the driver data including position information of a device used by each of the at least one potential driver when driving a vehicle;
performing clustering on the collected driver data;
setting a target position of the IMS for each of the at least one potential driver from a clustering result;
identifying a driver of the vehicle; and
reproducing the set target position based on the identified driver of the vehicle,
wherein in setting the target position, a maximum or minimum value of the driver data belonging to a cluster is set as the target position when the cluster is determined as a result of performing the clustering.

10. The method of claim 9, wherein
in setting the target position,
an average value of the most recent N data among the collected driver data is set as the target position when an amount of the collected driver data is insufficient to perform the clustering, wherein N is a natural number.

11. The method of claim 9, wherein
in setting the target position,
the last collected driver data is set as the target position when an amount of the collected driver data is insufficient to perform the clustering.

12. The method of claim 9, further comprising
stopping the reproduction when receiving a driver input while reproducing the target position.

13. The method of claim 9, wherein
identifying the driver includes
receiving information on which driver drives the vehicle at a specific time, and
identifying a corresponding driver for a current time as the driver of the vehicle based on the information.

14. The method of claim 9, wherein
identifying the driver includes
receiving information on a driver behavior pattern, and
identifying a corresponding driver for the behavior pattern as the driver of the vehicle based on the information.

15. The method of claim 9, wherein
in identifying the driver,
the driver of the vehicle is identified by using at least one of a driver condition monitoring device, a facial recognition device, a fingerprint recognition device, or a combination thereof.

16. The method of claim 9, wherein
in identifying the driver,
the driver of the vehicle is identified by using a pressure sensor mounted on a driver seat.

* * * * *